Dec. 13, 1955 O. P. SCHREIBER 2,727,084

RESILIENT METALLIC SHIELDING STRIP STRUCTURE

Filed March 19, 1952 2 Sheets-Sheet 1

INVENTOR.
Otmar P. Schreiber,
BY George D. Richards
Attorney

Dec. 13, 1955 O. P. SCHREIBER 2,727,084

RESILIENT METALLIC SHIELDING STRIP STRUCTURE

Filed March 19, 1952 2 Sheets-Sheet 2

INVENTOR.
Otmar P. Schreiber,
BY George D. Richards
Attorney

United States Patent Office 2,727,084

Patented Dec. 13, 1955

2,727,084

RESILIENT METALLIC SHIELDING STRIP STRUCTURE

Otmar P. Schreiber, Middlesex, N. J., assignor to Metal Textile Corporation, Roselle, N. J., a corporation of Delaware Application March 19, 1952, Serial No. 277,367

3 Claims. (Cl. 174—35)

This invention relates to an improved resilient metallic strip structure for shielding radio-frequency energy in connection with electronic and other electrical equipment.

Heretofore shielding strips, gaskets and the like have been produced from knitted metallic wire, such as nickel-copper alloy, beryllium copper, nickel silver alloy, silver plated copper, and other metals and metallic alloys; the knitted material being folded or rolled upon itself into a desired shape and mass. Shielding strips thus produced, especially when used as shields between large opening doors or covers of metal cabinets or chassis enclosures for electronic and other electrical equipment, although possessing a degree of resiliency, were often too hard to assure all around contact between door or cover and cabinet, or to take up the manufacturing fitting tolerances allowed in such structures, under pressures available to compress the strip, or to do so had to be provided in such large dimensions as to involve waste of space and material. As a consequence there was no reliable assurance against formation of leakage paths between the door or cover and cabinet.

Having the above in view, it is an object of this invention to provide a novel resilient strip structure, the main body of which is formed from knitted metallic wire mesh, which, within a normal or desired minimum predetermined thickness or height dimension, possesses a maximum degree of compressible resiliency and amplitude of deflection, whereby to assure that the strip will fill all space between the closed door or cover and cabinet, regardless of inequalities therebetween due to warping, or due to manufacturing tolerances allowed in connection with the fitting of the door or cover to the cabinet opening, and thus to provide a strip structure of assured shielding efficiency, free from leak paths.

The invention has for a further object to provide a yieldable shielding strip structure having a modulus of resilient deflection such that it will be responsive to a minimum of compression force, as well as one in which the deflection-to-force characteristic is more linear than in the case of a comparative strip of rectangular or circular cross-section.

The invention has for another object to provide a method of producing the shielding strip structure of this invention.

The above and other objects of this invention will be understood from a reading of the following detailed description thereof in connection with the accompanying drawings, in which.

Figure 7:
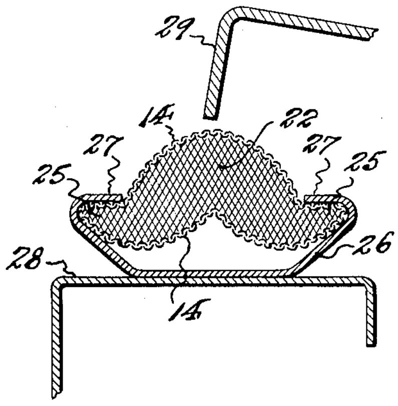
Figure 8:
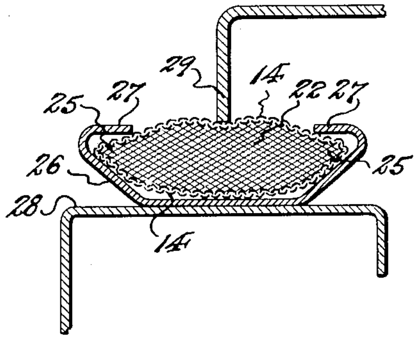

Fig. 7 is a cross-sectional view of the shielding strip body as assembled with and supported by a channeled sheet metal carrier member, and as applied to a cabinet for engagement by a door or cover by which the opening thereof is closed, said door or cover being shown in open condition; and Fig. 8 is a view similar to that of Fig. 7, but with the door or cover closed upon the shielding strip body to compress the same to operative shielding relation to and between the closed door or cover and cabinet.

Similar characters of reference are employed in the above described views, to indicate corresponding parts.

Figures 1, 2:
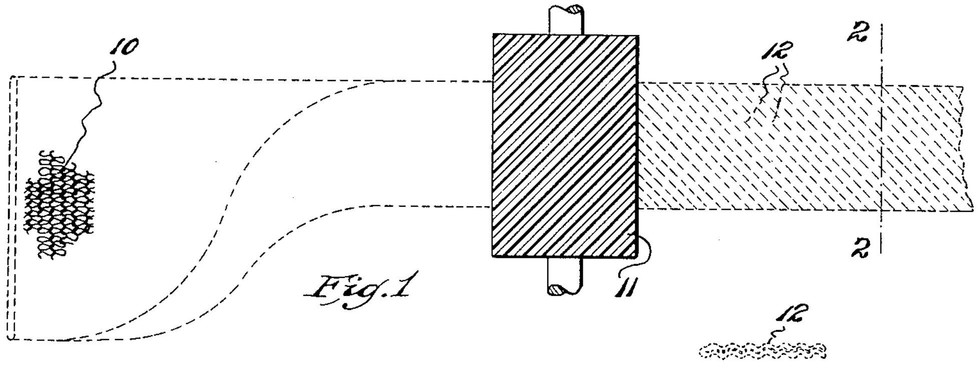
Fig. 1 is a schematic view showing the first step in treating a tubular knit metallic mesh material in preparation for the formation therefrom of a shielding strip body according to this invention.
Fig. 2 is a cross-sectional view of the initially prepared knitted mesh material.
Figure 4:
Fig. 4 is a cross-sectional view, taken on line 4—4 in Fig. 3.
Figure 3:
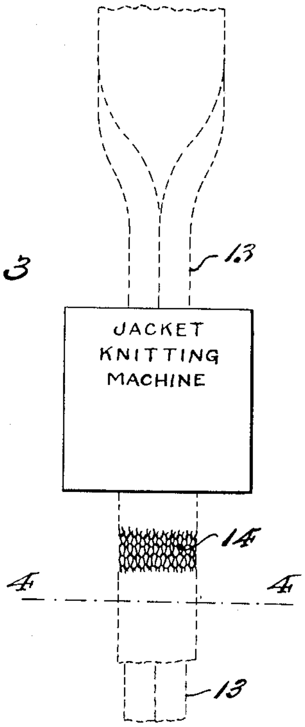
Fig. 3 is a schematic view showing the next step in treating the initially prepared knitted mesh material of Figs. 1 and 2 to form the same into a strip body mass, and to provide the same with an enclosing jacket of tubular knit metallic wire mesh.

The shielding strip body according to this invention is produced from knitted wire mesh 10, which may be either of the tubular knit type or of the flat knit type. Preferably, a tubular knit length of wire mesh 10, of suitable width, wire gauge and loop size, is flattened and then folded longitudinally upon itself. This folded length of knitted mesh is passed through the nip of corrugating rolls 11, whereby to form therein oblique corrugations 12 across the width thereof (see Figs. 1 and 2). The length of knitted wire mesh, as thus initially prepared, is further manipulated to form the same into a body 13 having a bulk of desired width and thickness. This may be done by again folding the initially prepared corrugated length of mesh longitudinally upon itself, or by passing the same through a die adapted to shape it to the desired cross-sectional bulk. Since the initially prepared mesh has been corrugated, when the length of the same is wrought to desired cross-sectional bulk, the aggregated corrugations will produce a mass of considerable resiliency or elastic compressibility. The body 13 of mesh material, shaped and proportioned as above described, is next passed through a circular knitting machine, whereby to enclose the same in a tubular knit wire mesh covering sleeve or jacket 14 (see Figs. 3 and 4).

Although it is generally desirable to provide the initially prepared knitted wire mesh material in the corrugated form above described, since such form enhances the resiliency of the body 13 produced therefrom, this is not always essential, and consequently said body 13 may be produced from non-corrugate knitted wire mesh within the broader aspects of this invention.

Figure 5:
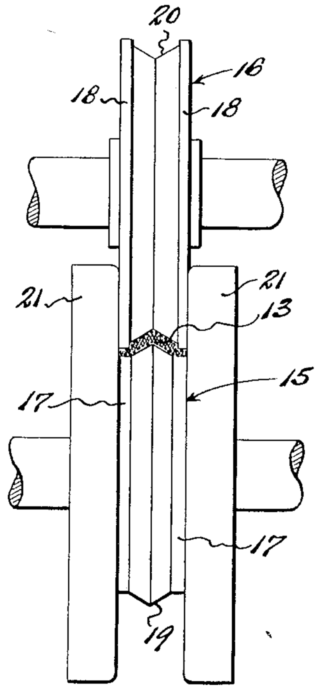
Fig. 5 is a schematic view showing a succeeding step of the method for shaping the jacketed body mass of knitted metallic mesh material into a shielding strip body formation according to this invention.

The jacketed knitted wire mesh body 13—14 provides the base formation from which the resilient body formation of the shielding strip of this invention is produced. The means for producing the body formation of said shielding strip preferably comprises a pair of cooperative molding rolls 15 and 16 (see Fig. 5), although other forms of shaping dies or molding means can be used. Said molding rolls comprise the male molding roll 15 and the female molding roll 16. Said molding rolls are respectively shaped to provide, coincident with their opposite sides, with compactor sections 17 and 18. The compactor sections 17 of the male molding roll 15 are opposed to the compactor sections 18 of the female molding roll 16 in such spaced relation as to provide a nip therebetween which is adapted to firmly compress and consolidate the longitudinal marginal portions of the jacketed knitted wire mesh body 13—14 when passed therethrough. Intermediate its compactor sections 17, the male molding roll 15 is provided with a substantially convex shielding strip bottom molding section 19, and the female molding roll 16 is provided, intermediate its compactor sections 18, with a substantially concave shielding strip top molding section 20. Said molding sections 19 and 20 are opposed in such relation as to shape the jacketed knitted wire mesh body 13—14 to a resiliently yieldable substantially arched formation. The sides of the male molding roll 15 are provided with side wall sections 21 which embrace the opposing portion of the female molding roll 16, thus confining the jacketed knitted wire mesh body 13—14 subject to the shaping operation of said molding rolls.

Figure 6:
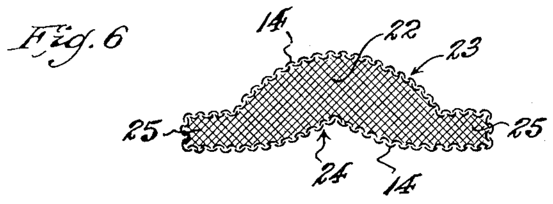
Fig. 6 is a cross-sectional view of the shaped shielding strip body, this view being drawn on an enlarged scale.

By its passage through the nip of said molding rolls 15 and 16, the jacketed wire mesh body 13—14 is wrought to the required shielding strip body formation (see Fig. 6), said formation comprising an upwardly arched central cushion portion 22 having a transversely convex top surface 23 and a transversely concave bottom surface 24, said cushion portion being of highly resilient or elastically compressible character. Said cushion portion 22 is bordered along its respective longitudinal sides with outwardly extending marginal anchoring portions or footing flanges 25 which are integral therewith, and which are formed by firmly compressed and consolidated marginal parts of the jacketed knitted wire mesh body.

To complete the shielding strip structure of this invention, the shielding strip body formation is entered in a supporting channeled sheet metal carrier member 26 which is provided, in extension from its side walls, with inwardly projecting keeper flanges 27, beneath which the anchoring portions or footing flanges 25 of the shielding strip body formation are engaged, whereby to retain said formation in assembled relation to the carrier member. The internal width of the channeled carrier member 26 is somewhat less than the overall width of the shielding strip body formation, so that when the latter is entered in the former it will be somewhat laterally compressed. Due to the lateral compression to which the shielding strip body formation is subjected by its confinement between the sides of the channeled carrier member 26, the central concavo-convex cushion portion 22 of the formation is caused to bulge outwardly between the opposed margins of the keeper flanges 27 of said carrier member, and the concavo bottom surface thereof to lift to a maximum spaced relation to and above the bottom of said carrier member (see Fig. 7). By reason of this change in the cross-sectional contours of the cushion portion 22, the same is capable of greater amplitude of deflection under pressure externally applied thereto, and its deflection over a greater distance will require application of much less force than would be necessary with respect to a strip of either circular or rectangular cross-sectional shape. Furthermore, the greater amplitude of its resilient or elastically compressible reaction, and its relatively soft character, will better assure complete and positive conforming contact with a door or cover which is closed against the same, regardless of inequalities in the engaging portions of said door or cover, or tolerance differences in the fitting of said door or cover to the cabinet or other enclosure served thereby.

In use, as shown in Figs. 7 and 8, the shielding strip structure is affixed to a cabinet or other enclosure 28 which houses electronic or other equipment, to extend around the marginal portions of an opening thereof which is to be closed by a door or cover 29. The shielding strip structure can be secured in place by spot welding or otherwise fastening the carrier member 26 to the cabinet or other enclosure, whereby to dispose the cushion member 22 in position to be engaged by said door or cover 29 when the latter is closed.

As shown in Fig. 8, when the door or cover 29 is closed, its engaging margin will press against the cushion portion 22 of the shielding strip structure, which will readily yield to the closing pressure thereof, and in so doing will easily deflect and yet, by reason of its resiliency, will conform itself to the contours of the engaging portions of the door or cover so as to fully close all space intervening between the door or cover and the cabinet, and thus will assuredly provide the shielding effect required, free from gaps or leak paths. Due to its resiliency, whenever the door or cover is opened, the cushion portion 22 of the shielding strip body formation will immediately resume its normal outwardly bulged condition.

It will be obvious, from the above, that the shielding strip structure of this invention is especially well adapted for use in connection with cabinets or enclosures for housing large electronic equipment, such e. g. as door equipped transmitter housings, or in housing enclosures for other large electrical equipment, shielding of which is desirable.

Although it is generally preferable to provide the shielding strip body formation with the supporting channeled carrier member 26, there are circumstances in which the shielding strip body formation can be used without said carrier member, and in such case the formation may be secured by its marginal footing flanges 25 in any suitable manner directly to the equipment enclosure desired to be served thereby.

Having now described my invention, I claim:

1. A shielding strip structure comprising a strip body formation produced from compacted knitted wire mesh to provide a longitudinally extending, transversely concavo-convex, elastically compressible cushion portion bordered along its longitudinal sides by laterally projecting, relatively dense and non-compressible footing flanges, a jacket of tubular knit wire mesh fabric enclosing said strip body formation, and a channeled carrier member in which said strip body formation is supported, said carrier member having keeper flanges inwardly projecting from its opposite sides, beneath which said footing flanges are engaged, whereby to retain said strip body formation in assembled relation to the carrier member, said carrier member being of less internal width than the overall width of said strip body formation, whereby the latter when entered in the former, is subjected to lateral compression effective to bulge said cushion portion outwardly from the carrier member and also lift the concave bottom thereof to maximum spaced relation to the bottom of the carrier member, thereby to increase the amplitude of elastic deflection of said cushion portion under pressure applied thereto.

2. A shielding strip structure according to claim 1, wherein the knitted wire mesh, from which the strip body formation is produced, is provided with oblique corrugation across the width thereof.

3. A shielding strip structure comprising a strip body formation produced from compacted knitted wire mesh to provide a longitudinally extending, transversely concavo-convex, elastically compressible cushion portion bordered along its longitudinal sides by laterally projecting, relatively dense and non-compressible footing flanges, and a channeled carrier member in which said strip body foundation is supported, said carrier member having keeper flanges inwardly projecting from its opposite sides, beneath which said footing flanges are engaged, whereby to retain said strip body formation in assembled relation to the carrier member, said carrier member being of less internal width than the overall width of said strip body formation, whereby the latter, when entered in the former, is subjected to lateral compression effective to bulge said cushion portion outwardly from the carrier member and also lift the concave bottom thereof to maximum spaced relation to the bottom of the carrier member, thereby to increase the amplitude of elastic deflection of said cushion portion under pressure applied thereto.

References Cited in the file of this patent

UNITED STATES PATENTS

| | | |
|---|---|---|
| 1,489,184 | Welch | Apr. 1, 1924 |
| 1,727,184 | Thompson | Sept. 3, 1929 |

(Other references on following page)

UNITED STATES PATENTS

| | | |
|---|---|---|
| 1,731,514 | Welcome | Oct. 15, 1929 |
| 1,765,333 | Hood | June 17, 1930 |
| 2,180,177 | Ternstrom | Nov. 14, 1939 |
| 2,219,962 | Reynolds | Oct. 29, 1940 |
| 2,250,863 | Goodloe | July 29, 1941 |
| 2,263,653 | Smith et al. | Nov. 25, 1941 |
| 2,462,334 | Pierson | Feb. 22, 1949 |

| | | |
|---|---|---|
| 2,477,267 | Robinson | July 26, 1949 |
| 2,519,436 | Cadman | Aug. 22, 1950 |

FOREIGN PATENTS

| | | |
|---|---|---|
| 487,463 | Great Britain | June 21, 1938 |

OTHER REFERENCES

Hall: Abstract of application 616,923, published March 19, 1952, 656 O. G. 884 (filed Sept. 17, 1945).